United States Patent [19]

Bauer

[11] Patent Number: 5,424,053
[45] Date of Patent: Jun. 13, 1995

[54] PROCESS FOR THE PREPARATION OF MIXTURES OF SYNTHETIC, CRYSTALLINE KENYAITE AND SALTS WHICH SPLIT OFF OXYGEN

[75] Inventor: Harald Bauer, Flörsheim, Germany

[73] Assignee: Hoechst Aktiengellschaft, Frankfurt am Main, Germany

[21] Appl. No.: 202,996

[22] Filed: Feb. 28, 1994

[30] Foreign Application Priority Data

Mar. 13, 1993 [DE] Germany .................. 43 08 062.6

[51] Int. Cl.$^6$ ............................................. C01B 33/38
[52] U.S. Cl. ..................................... 423/332; 423/333
[58] Field of Search .................. 423/332, 333; 502/80, 502/84

[56] References Cited

U.S. PATENT DOCUMENTS

| | | | |
|---|---|---|---|
| 3,959,445 | 5/1976 | Jayawant et al. | 423/332 |
| 4,578,258 | 3/1986 | Rieck et al. | 423/333 |
| 4,581,213 | 4/1986 | Rieck | 423/325 |
| 4,589,988 | 5/1986 | Rieck et al. | 252/8.8 |
| 4,728,443 | 3/1988 | Rieck et al. | 252/8.6 |
| 4,742,039 | 5/1988 | Hanauer et al. | 502/407 |
| 4,806,327 | 2/1989 | Rieck et al. | 423/332 |
| 5,160,718 | 11/1992 | Kosuge et al. | 423/332 |
| 5,236,681 | 8/1993 | Chu et al. | 423/333 |

FOREIGN PATENT DOCUMENTS

| | | |
|---|---|---|
| 0175287 | 3/1986 | European Pat. Off. . |
| 0205070 | 12/1986 | European Pat. Off. . |
| 220326 | 3/1985 | Germany . |
| 3400130 | 7/1985 | Germany . |
| 234878 | 4/1986 | Germany . |

OTHER PUBLICATIONS

Beneke et al "Kenyaite—Synthesis And Properties," *American Mineralogist* vol. 68 pp. 818–826 (1983) No Month.
*Ullmanns Enzyklopadie der technischen Chemie*, 4th Ed., vol. 17, pp. 724–725. (No Date Available).
Bergk et al., Seifen-öle-Fette-Wachse, 15:113 (Sep. 1987) pp. 555–561.

*Primary Examiner*—Mark L. Bell
*Assistant Examiner*—David R. Sample
*Attorney, Agent, or Firm*—Connolly and Hutz

[57] ABSTRACT

The invention relates to a process for the preparation of mixtures of synthetic, crystalline kenyaite and salts which split off oxygen. For this purpose, 1 mol of soda-water glass which has a molar ratio of $SiO_2$:$Na_2O = 1$:(0.25 to 0.5) is mixed with 0.1 to 0.9 mol of a compound which has a pH of less than 10.5 in molar aqueous concentration, as a neutralizing agent. In the presence of kenyaite seed crystals, the reaction mixture is heated at temperatures from 373 to 523 K. in an autoclave for 1 to 10 hours and, after cooling, 0.15 to 1.5 mol of hydrogen peroxide are added per mol of soda-water glass employed. The solid is isolated from the reaction suspension as dry substance.

16 Claims, No Drawings

PROCESS FOR THE PREPARATION OF MIXTURES OF SYNTHETIC, CRYSTALLINE KENYAITE AND SALTS WHICH SPLIT OFF OXYGEN

The invention relates to a process for the preparation of mixtures of synthetic, crystalline kenyaite and salts which split off oxygen.

According to U.S. Pat. No. 4,581,213, kenyaite can be prepared by a very involved process. In U.S. Pat. No. 4,581,213 kenyaite is designated sodium salt(I) or Na-SKS-1.

Crystalline laminar silicates, which include kenyaite, act as ion exchangers and are added to detergents as softeners. Detergents often contain peroxides as bleaching agents, oxidizing agents and disinfectants. Undesirable degradation of the peroxide occurs during storage of the detergent.

There was therefore the object of discovering a process for the preparation of mixtures of synthetic, crystalline kenyaite and salts which split off oxygen in which no salt formation leads to an undesirable pollution of the wastewater, which is based on inexpensive starting substances, which operates with good space/time yields and with which only slight decomposition of the peroxide occurs.

This is achieved according to the invention by a procedure which comprises, during preparation of a mixture of kenyaite and salts which split off oxygen, mixing 1 mol of soda-water glass which has a molar ratio of $SiO_2:Na_2O = 1:(0.25$ to $0.5)$ with 0.1 to 0.9 mol of a compound which has a pH of less than 10.5 in molar aqueous concentration, as a neutralizing agent, heating the mixture at temperatures of 373 to 523 K., in particular 453 to 493 K., in an autoclave for 1 to 10 hours in the presence of kenyaite seed crystals and, after cooling, adding 0.1 to 1.5 mol of hydrogen peroxide per mol of soda-water glass employed and isolating the solid and the dissolved substances from the reaction suspension as dry substance.

The process according to the invention can furthermore optionally also comprise a procedure in which a) peroxide salt-forming compounds, such as phosphoric acid, boric acid, silicic acid, carbon dioxide, alkali metal hydrogencarbonate, alkali metal dihydrogen phosphate or sodium tetraborate, are used in particular as the neutralizing agent;

b) the amount of neutralizing agent is metered in such that a ratio of $SiO_2:Na_2O=(4$ to $20):1$ is present in the reaction suspension;

c) the hydrogen peroxide is added in the form of a 5 to 75% by weight aqueous solution;

d) 0.5 to 10% by weight of seed crystals, based on the $SiO_2$ weight content in the soda-water glass, is added;

e) the reaction is carried out in an autoclave at a molar ratio of $SiO_2:H_2O=1:(5$ to $100)$;

f) the reaction is carried out in an autoclave in the presence of compounds from the group comprising aluminum, phosphorus, boron and heavy metals, such as, for example, iron;

g) the reaction mixture in the autoclave is adjusted to a pH of 9 to 12 before heating;

h) the process is carried out continuously;

i) in the continuous process, 5 to 30% by weight of seed crystals, based on the $SiO_2$ weight content in the soda-water glass, are added;

j) peroxide-stabilizing compounds from the group comprising magnesium silicate, ethylenediaminetetraacetic acid and tripolyphosphoric, pyrophosphoric and orthophosphoric acid, in each case in the form of their sodium salts, are added to the reaction mixture in the autoclave;

k) the solid and the substances dissolved in the reaction suspension are isolated as dry substance by vacuum evaporation;

the dry substance is isolated from the reaction suspension with a heated stream of gas at a solids temperature of between 303 and 363 K. in a fluidized bed drier, drum drier, spray drier or granulator;

m) the reaction suspension is separated into a filtercake and filtrate, which are dried separately, and the resulting dry substances are mixed with one another;

n) some of the hydrogen peroxide is added to the filtrate, the filtrate is evaporated to dryness and the residue is combined in comminuted form with the dry filtercake;

o) 1 mol of soda-water glass which has a molar ratio of $SiO_2:Na_2O = 1:(0.25$ to $0.5)$ is mixed with 0.1 to 0.9 mol of a compound which has a pH of less than 10.5 in molar aqueous concentration, as the neutralizing agent, and the mixture is heated at temperatures of 373 to 523 K., in particular 453 to 493 K., in an autoclave for 1 to 10 hours in the presence of kenyaite seed crystals, the dry substance is isolated and 0.15 to 1.5 mol of hydrogen peroxide per mol of soda-water glass employed are added to this dry substance.

The mixture prepared by the process according to the invention can be employed for washing, cleaning, bleaching or rinsing textiles or utensils by itself or together with customary auxiliaries, such as, for example, surfactants, zeolites, tripolyphosphates, builders or oxycarboxylates.

Reaction times of not more than 6 hours at reaction temperatures of 468 to 493 K. are required for the synthesis of kenyaite.

The addition of seed crystals has an essential influence on the nature of the laminar silicates which crystallize out and the reaction times. However, kenyaite is also formed, in a reduced purity, over longer reaction times without the addition of seed crystals. It goes without saying that the finished salt mixture or the suspension can also be added as the seed crystal.

It is advantageous for a continuous reaction procedure not to empty the autoclave completely but always to keep it filled at least in part with product mixture formed from the silicate which has crystallized out, the mother liquor and unreacted starting substances. A high content of silicate crystals thus remains in the autoclave, promoting further formation of crystalline silicate.

The reaction of the alkali metal salts with hydrogen peroxide can be carried out in the same container as the laminar silicate synthesis. It is then advantageous to evaporate the entire reaction solution.

Mixtures which comprise up to 19.6, preferably up to 13.9% by weight of peroxide can be obtained according to the invention.

The salt load of the wastewater which results from the sodium carbonate peroxohydrate preparation and is caused by the preparation is also eliminated by the process according to the invention.

Sodium carbonate peroxohydrate, which is used as a bleaching agent, oxidizing agent and disinfectant, is obtained from aqueous solutions of sodium carbonate and hydrogen peroxide, sodium chloride, sodium polyphosphates or polyacrylates being used as salting out and crystallization auxiliaries (cf. "Ullmanns Encyklopä die der technischen Chemie (Ullmann's Encyclopedia of Industrial Chemistry)", 4th Edition, Volume 17, pages 724/725).

The good properties of the mixture according to the invention are based on the one hand on the ion exchange capacity of the laminar silicate, which means that the hardnessforming agents of the washwater do not precipitate out, and on the other hand, because of the significantly lower alkalinity, on a distinct stabilization of the peroxide content during storage.

Products which are prepared according to optional embodiment o) have a lower storage stability of the peroxide.

The invention is illustrated in more detail with the aid of the examples.

EXAMPLE 1

1643 g of reaction mixture having the molar composition of $0.311\ Na_2O:0.0054\ Al_2O_3:1\ SiO_2:32.6\ H_2O$ are prepared from 563 parts by weight of soda-water glass (26.3% of $SiO_2$, 8.43% of $Na_2O$ and 0.24% of $Al_2O_3$) and 1080 parts by weight of water. 4 g of crystalline kenyaite from a previous experiment are then added. $CO_2$ is passed in at 347 K., while stirring, up to a pH of 9.1. The reaction mixture is heated to 478 K. in a stainless steel autoclave, while stirring, and is kept under these conditions under a pressure of 16 bar for 4 hours. After cooling, 59.1 g of $H_2O_2$ (70% by weight) are added to the suspension and the mixture is evaporated to dryness. 281.7 g of a mixture of kenyaite and sodium percarbonate with a peroxide content of 8.86% by weight (as $H_2O_2$) are obtained.

EXAMPLE 2

A water-glass solution is prepared with kenyaite seed crystals in accordance with Example 1. 74.8 g of $NaHCO_3$ are added while stirring. The reaction mixture is further treated as in Example 1. After cooling, 84.9 g of $H_2O_2$ (70% by weight) are added to the suspension and the mixture is evaporated to dryness. 296.9 g of a mixture: of kenyaite and sodium percarbonate having a peroxide content of 10.93% by weight (as $H_2O_2$) are obtained.

We claim:

1. A process for the preparation of a mixture of synthetic, crystalline kenyaite and salts which split off oxygen, which comprises mixing 1 mol of soda-water glass which has a molar ratio of $SiO_2:Na_2O=1:(0.25\ to\ 0.5)$ with 0.1 to 0.9 mol of a compound which has a pH of less than 10.5 in molar aqueous concentration, as a neutralizing agent, heating the mixture at temperatures of 373 to 523 K., in an autoclave for 1 to 10 hours in the presence of kenyaite seed crystals and, after cooling, adding 0.15 to 1.5 mol of hydrogen peroxide per mol of soda-water glass employed and isolating the solid from the reaction suspension as dry substance.

2. The process as claimed in claim 1, wherein peroxide salt-forming compounds selected from the group consisting of phosphoric acid, boric acid, silicic acid, carbon dioxide, alkali metal hydrogencarbonate, alkali metal hydrogen phosphate and sodium tetraborate are used as the neutralizing agent.

3. The process as claimed in claim 1, wherein the amount of neutralizing agent is adjusted in such that a ratio of $SiO_2:Na_2O=(4\ to\ 20):1$ is present in the reaction mixture in the autoclave.

4. The process as claimed in claim 1, wherein the hydrogen peroxide is added in the form of a 5 to 75% by weight aqueous solution.

5. The process as claimed in claim 1, wherein 0.5 to 10% by weight of seed crystals, based on the $SiO_2$ weight content in the soda-water glass, is added.

6. The process as claimed in claim 1, wherein the reaction is carried out in an autoclave at a molar ratio of $SiO_2:H_2O=1:(5\ to\ 100)$.

7. The process as claimed in claim 1, wherein the reaction is carried out in an autoclave in the presence of compounds selected from the group consisting of aluminum, phosphorus, boron and heavy metals.

8. The process as claimed in claim 1, wherein the reaction mixture in the autoclave is brought to a pH of 9 to 12 before heating.

9. The process as claimed in claim 1, wherein the process is carried out continuously.

10. The process as claimed in claim 9, wherein, in the continuous process, 5 to 30% by weight of seed crystals, based on the $SiO_2$ weight content in the soda-water glass, are added.

11. The process as claimed in claim 1, wherein peroxide-stabilizing compounds selected from the group consisting of magnesium silicate, ethylenediaminetetraacetic acid and tripolyphosphoric, pyrophosphoric and orthophosphoric acid, in each case in the form of their sodium salts, are added to the reaction mixture in the autoclave.

12. The process as claimed in claim 1, wherein the solid and the substances dissolved in the reaction suspension are isolated as the dry substance by vacuum evaporation.

13. The process as claimed in claim 1, wherein the dry substance is isolated from the reaction suspension with a heated stream of gas at a solids temperature of between 303 and 363 K. in a fluidized bed drier, drum drier, spray drier or granulator.

14. The process as claimed in claim 1, wherein the reaction suspension is separated into a filtercake and filtrate, which are dried separately, and the resulting dry substances are mixed with one another.

15. The process as claimed in claim 14, wherein some of the hydrogen peroxide is added to the filtrate, the mixture is evaporated to dryness and the residue is combined in comminuted form with the dried filtercake.

16. The process as claimed in claim 1, wherein the dry substance is isolated and 0.15 to 1.5 mol of hydrogen peroxide per mol of soda-water employed are added to the dry substance.

* * * * *